US012726258B2

(12) United States Patent
Takahashi

(10) Patent No.: US 12,726,258 B2
(45) Date of Patent: Sep. 1, 2026

(54) FLIGHT VEHICLE, COMMUNICATION MANAGEMENT SYSTEM, CONTROL SYSTEM, AND CONTROL METHOD

(71) Applicant: SoftBank Corp., Tokyo (JP)

(72) Inventor: Makoto Takahashi, Tokyo (JP)

(73) Assignee: SoftBank Corp., Tokyo (JP)

( * ) Notice: Subject to any disclaimer, the term of this patent is extended or adjusted under 35 U.S.C. 154(b) by 568 days.

(21) Appl. No.: 18/327,059

(22) Filed: Jun. 1, 2023

(65) Prior Publication Data

US 2023/0308166 A1 Sep. 28, 2023

Related U.S. Application Data

(63) Continuation of application No. PCT/JP2021/046359, filed on Dec. 15, 2021.

(30) Foreign Application Priority Data

Dec. 24, 2020 (JP) ................................ 2020-215886

(51) Int. Cl.
*H04B 7/185* (2006.01)
*B64C 39/02* (2023.01)

(52) U.S. Cl.
CPC ......... *H04B 7/18504* (2013.01); *B64C 39/02* (2013.01)

(58) Field of Classification Search
CPC ... H04B 7/18504; B64C 39/02; H04W 40/20; H04W 40/22; H04W 84/06; H04W 4/30
See application file for complete search history.

(56) References Cited

U.S. PATENT DOCUMENTS 5,465,096 A * 11/1995 Nawata ................ H04B 7/2041 455/12.1
2008/0175251 A1 7/2008 Oouchi
2014/0119354 A1 5/2014 Verma
2014/0152502 A1* 6/2014 Nishikata ............. G01S 13/003 342/372

(Continued)

FOREIGN PATENT DOCUMENTS

JP 2002211496 A 7/2002
JP 2006013640 A 1/2006

(Continued)

OTHER PUBLICATIONS

Extended European Search Report for counterpart European Application No. 21910539.2, issued by the European Patent Office on May 15, 2024.

(Continued)

*Primary Examiner* — Christine Ng

(57) ABSTRACT

Provided is a flight vehicle which has an antenna for forming a wireless communication area by irradiating beam towards a ground to provide a wireless communication service to a user terminal in the wireless communication area, the flight vehicle including an FL communication unit which communicates with a core network on the ground via a feeder link, a UP execution unit which executes a user plane function, and a communication control unit which performs control such that communication between a first user terminal in the wireless communication area and a second user terminal is relayed without intermediation of the core network by the user plane function.

13 Claims, 8 Drawing Sheets

(56) References Cited

U.S. PATENT DOCUMENTS

| | | | | |
|---|---|---|---|---|
| 2015/0009908 | A1 | 1/2015 | Kalapatapu | |
| 2015/0189542 | A1* | 7/2015 | Cazanas | H04L 12/189 370/312 |
| 2015/0189588 | A1* | 7/2015 | Westberg | H04W 52/0206 370/311 |
| 2016/0006883 | A1* | 1/2016 | Cartmell | H04M 15/66 455/408 |
| 2018/0132150 | A1* | 5/2018 | Du | H04W 36/0033 |
| 2019/0190635 | A1* | 6/2019 | Goel | H04W 72/0453 |
| 2019/0280762 | A1* | 9/2019 | Arcidiacono | H04B 7/19 |
| 2021/0400524 | A1* | 12/2021 | Kahn | H04W 76/12 |
| 2022/0078700 | A1* | 3/2022 | Minokuchi | H04W 48/14 |
| 2022/0141891 | A1* | 5/2022 | Masini | H04B 7/18528 370/316 |
| 2022/0287137 | A1* | 9/2022 | Futaki | H04W 48/20 |
| 2023/0300917 | A1* | 9/2023 | Min | H04W 56/005 370/328 |

FOREIGN PATENT DOCUMENTS

| | | | |
|---|---|---|---|
| JP | 2008177847 | A | 7/2008 |
| JP | 2019213078 | A | 12/2019 |

OTHER PUBLICATIONS

International Search Report and (ISA/237) Written Opinion of the International Search Authority for International Patent Application No. PCT/JP2021/046359, mailed by the Japan Patent Office on Mar. 22, 2022.

* cited by examiner

FLIGHT VEHICLE, COMMUNICATION MANAGEMENT SYSTEM, CONTROL SYSTEM, AND CONTROL METHOD

The contents of the following patent application(s) are incorporated herein by reference:

NO. 2020-215886 filed in JP on Dec. 24, 2020

NO. PCT/JP2021/046359 filed in WO on Dec. 15, 2021

BACKGROUND

1. Technical Field

The present invention relates to a flight vehicle, a communication management system, a control system, and a control method.

2. Related Art

A flight vehicle which has an antenna and flies in a stratosphere in order to provide a stratospheric platform has been proposed (for example, see Patent Document 1).

LIST OF CITED REFERENCES

Patent Document

Patent Document 1: Japanese Patent Application Publication No. 2002-211496

DESCRIPTION OF EXEMPLARY EMBODIMENTS

A flight vehicle such as an HAPS (High Altitude Platform Station) which forms a wireless communication area on a ground while flying in a sky, and provides a wireless communication service to a user terminal on the ground has been proposed. A base station mounted to the flight vehicle accesses a core network on the ground via a feeder link. When the base station of the flight vehicle relays communication between a plurality of user terminals via the core network on the ground similarly as in a base station on the ground, the communication is always performed via the feeder link, and a bandwidth of the feeder link is consumed. In addition, with regard to the feeder link, in general, a frequency is high, and a quality tends to deteriorate by an effect of weather. In the communication management system 10 according to the present embodiment, when user terminals at locations served by the flight vehicle mutually perform communication, the flight vehicle provides a scheme for relaying the communication between the mutual user terminals without the intermediation of the core network on the ground. Thus, a communication delay can be reduced, and a chance of the deterioration of the quality by the effect of the weather can be reduced.

Hereinafter, the present invention will be described through embodiments of the invention, but the following embodiments do not limit the invention according to claims. In addition, not all combinations of features described in the embodiment are essential to the solution of the invention.

Figure 1:
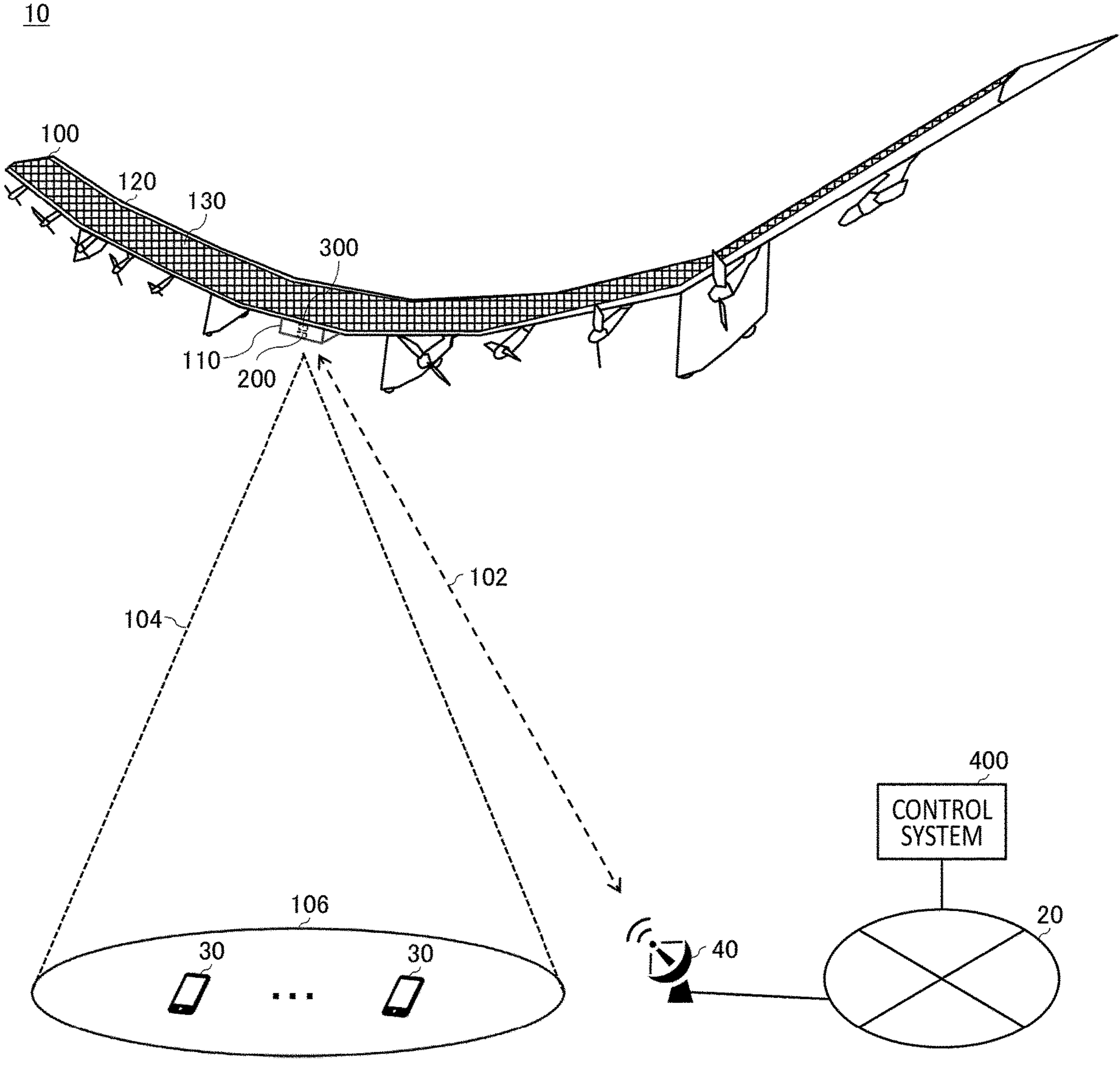
FIG. 1 schematically illustrates an example of a communication management system 10.

FIG. 1 schematically illustrates an example of a communication management system 10. The communication management system 10 may include an HAPS 100 and a control system 400.

The HAPS 100 may be an example of a flight vehicle. The HAPS 100 may function as a stratospheric platform. The HAPS 100 forms a feeder link 102 with a gateway 40 on the ground while flying in a stratosphere, and also forms a wireless communication area 106 by irradiating beam 104 towards the ground.

The HAPS 100 includes a main body section 110, a wing section 120, and a solar panel 130. Electric power generated by the solar panel 130 is stored in one or more batteries arranged in at least any of the main body section 110 or the wing section 120. The electric power stored in the battery is used by each component included in the HAPS 100.

A flight control device 200 and a communication control device 300 are arranged in the main body section 110. The flight control device 200 controls flight of the HAPS 100. The communication control device 300 controls communication of the HAPS 100.

The flight control device 200 controls the flight of the HAPS 100 by controlling, for example, a rotation of a propeller, an angle of a flap or an elevator, or the like. The flight control device 200 may manage various types of sensors included in the HAPS 100. Examples of the sensors include a positioning sensor such as a GPS (Global Positioning System) sensor, a gyro sensor, an acceleration sensor, and the like. The flight control device 200 may manage a position, an attitude, a movement direction, a movement speed, and the like of the HAPS 100 by outputs of the various types of sensors.

The communication control device 300 may form the feeder link 102 with the gateway 40 by using an FL (Feeder Link) antenna. The communication control device 300 may access a core network 20 via the gateway 40. The communication control device 300 may communicate with the control system 400 of the core network 20.

The communication control device 300 may form the wireless communication area 106 by irradiating the beam 104 towards the ground by using an SL (Service Link) antenna. The communication control device 300 may establish a service link with a user terminal 30 in the wireless communication area 106.

The communication control device 300 relays communication between the core network 20 and the user terminal 30 via the feeder link 102 and the service link, for example. The communication control device 300 may provide the wireless communication service to the user terminal 30 by relaying the communication between the user terminal 30 and the core network 20.

The HAPS 100 may circle in a sky above a target area in order to cover the target area on the ground by the wireless communication area 106. For example, while flying in the sky above the target area in a circular orbit, the HAPS 100 maintains the feeder link 102 with the gateway 40 by adjusting an orientation direction of the FL antenna, and maintains the coverage of the target area by the wireless communication area 106 by adjusting an orientation direction of the SL antenna.

The core network 20 may be managed by a telecommunications carrier. The core network 20 may be compliant to an LTE (Long Term Evolution) communication method. That is, the core network 20 may be an EPC (Evolved Packet Core). The core network 20 may be compliant to a 5G (5th Generation) communication method. That is, the core network 20 may be a 5GC (5th Generation Core network). The core network 20 may be compliant to a 3G (3rd Generation) communication method, or may be compliant to a 6G (6th Generation) communication method and subsequent communication methods.

The control system 400 may include some functions of the core network 20. In this case, the control system 400 includes a part of the core network 20, and the other part of the core network 20 is arranged outside the control system 400. The control system 400 may include all functions of the core network 20.

For example, when the core network 20 is compliant to the LTE communication method, the control system 400 includes some or all of an HSS (Home Subscriber Server), an MME (Mobility Management Entity), an SGW (Serving Gateway), a PGW (Packet Data Network Gateway), and a PCRF (Policy and Charging Rules Function).

For example, when the core network 20 is compliant to the 5G communication method, the control system 400 includes a part or all of a UDM (Unified Data Management), an AMF (Access and Mobility Management Function), an SMF (Session Management Function), a PCF (Policy Control Function), an AUSF (Authentication Server Function), and an NSSF (Network Slice Selection Function).

Figure 2:
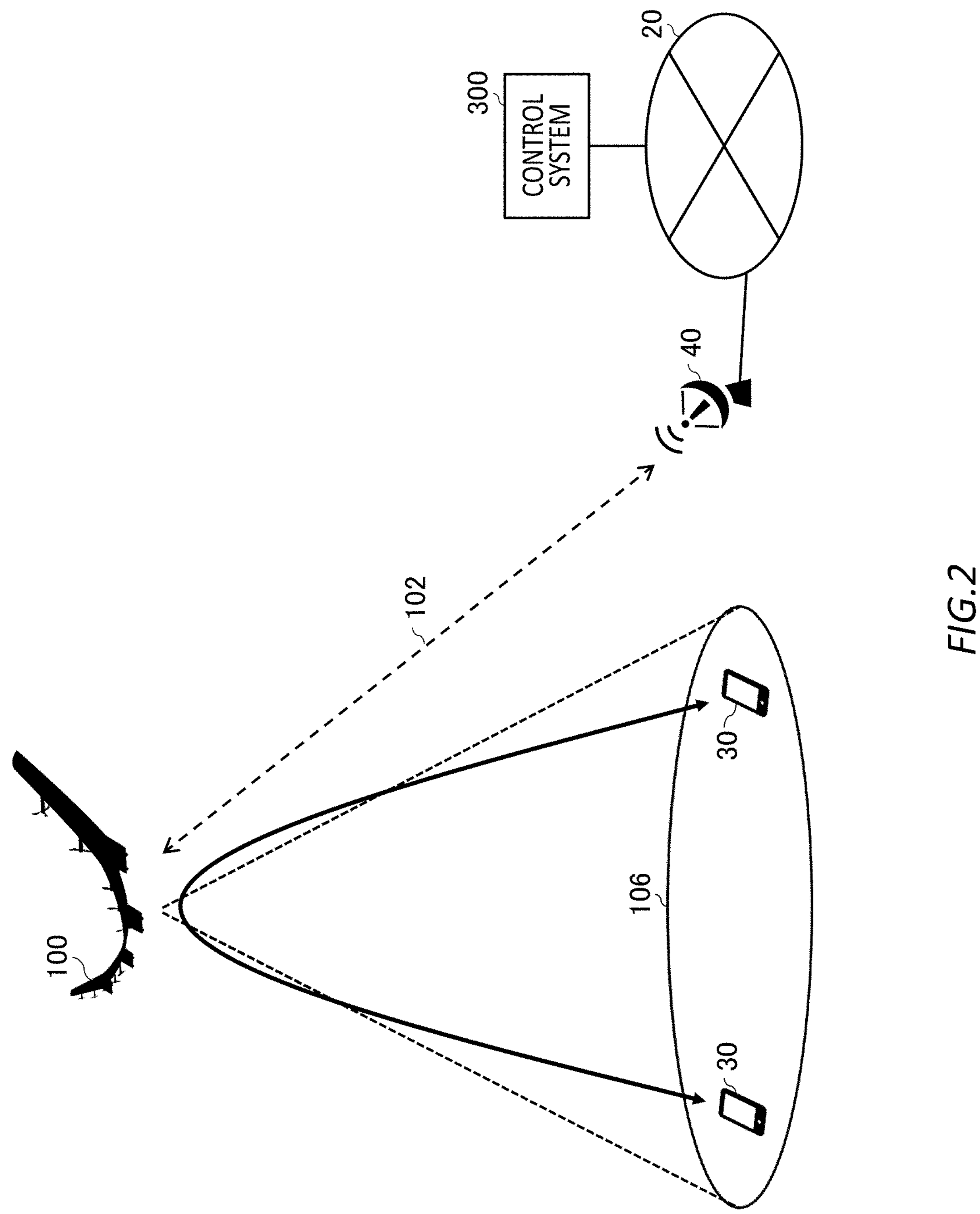
FIG. 2 is an explanatory diagram for describing relay of communication by an HAPS 100.

FIG. 2 is an explanatory diagram for describing relay of communication by an HAPS 100. A user plane function is implemented in the HAPS 100 according to the present embodiment. When the core network 20 is compliant to the LTE communication method, an SPGW-U may be implemented in the HAPS 100. When the core network 20 is compliant to the 5G communication method, a UPF (User Plane Function) may be implemented in the HAPS 100.

When a first user terminal 30 and a second user terminal 30 which are served by the HAPS 100 perform communication, the HAPS 100 communicates with the core network 20 on the ground via the feeder link 102 with regard to control data of a control plane, and relays, on the other hand, the communication between the first user terminal 30 and the second user terminal 30 without intermediation of the core network 20 with regard to user data of a user plane.

Thus, the communication delay can be reduced as compared with a case where the user data is relayed via the feeder link 102 and the core network 20. In addition, the bandwidth consumption of the feeder link 102 can be reduced. In addition, it is possible to avoid the effect from the weather or the like between the HAPS 100 and the gateway 40 in the relay of the user data.

Figure 3:
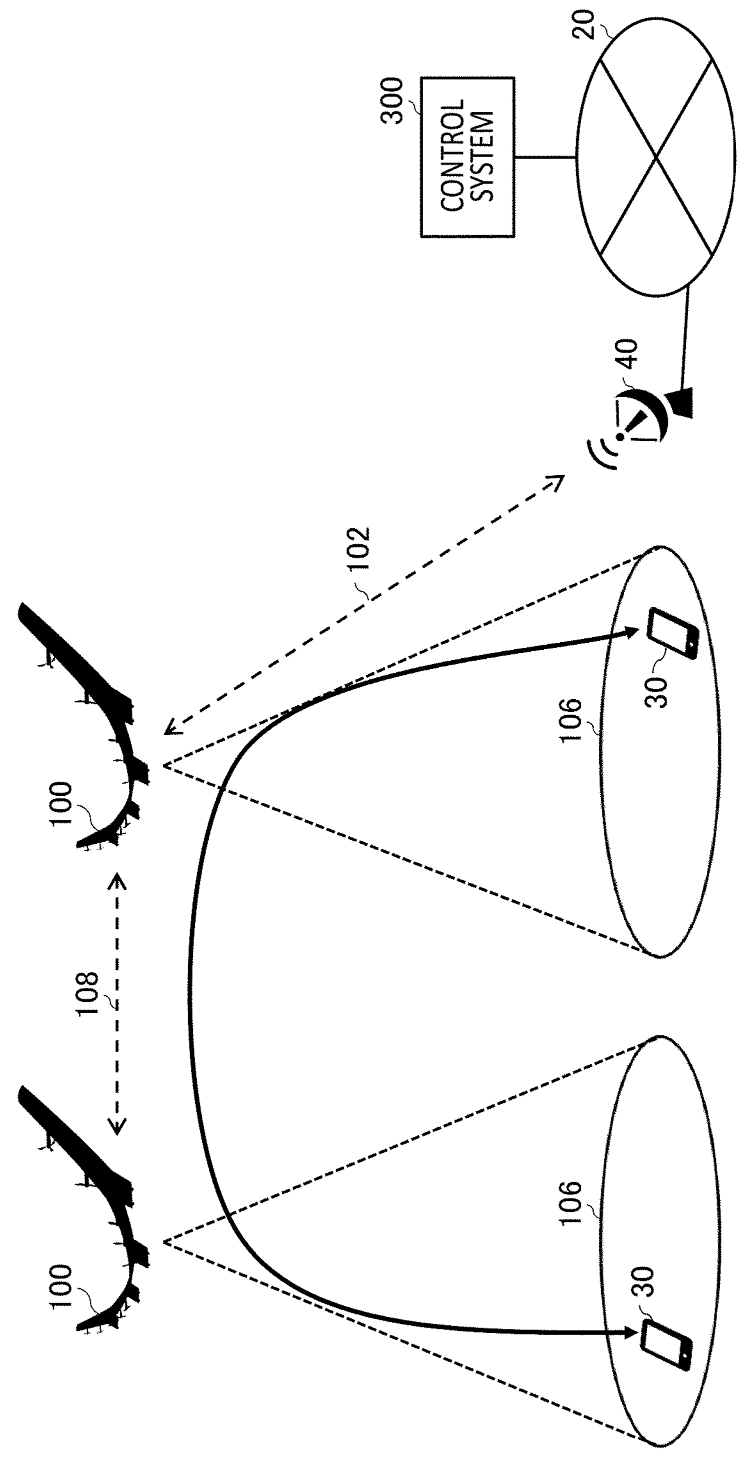
FIG. 3 is an explanatory diagram for describing relay of communication by the HAPS 100.

FIG. 3 is an explanatory diagram for describing relay of communication by the HAPS 100. Herein, different aspects from FIG. 2 will be mainly described. The HAPS 100 according to the present embodiment may have a function of directly wirelessly communicating with another HAPS 100 in the sky. The HAPS 100 may communicate with the other HAPS 100 via a feeder link 108.

When the first user terminal 30 served by the HAPS 100 and the second user terminal 30 served by the other HAPS 100 perform communication, the HAPS 100 communicates with the core network 20 on the ground via the feeder link 102 with regard to the control data of the control plane, and relays, on the other hand, the communication between the first user terminal 30 and the second user terminal 30 without intermediation of the core network 20 with regard to the user data of the user plane.

Figure 4:
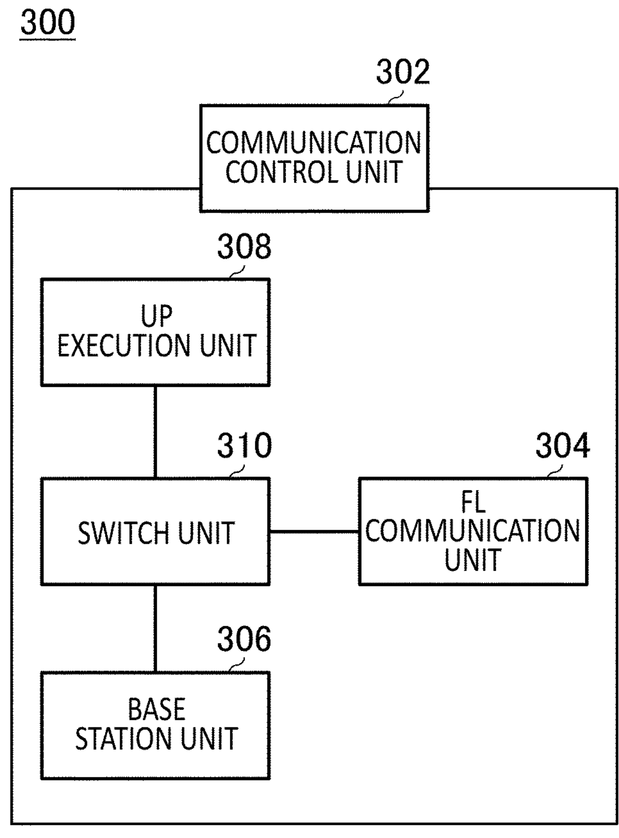
FIG. 4 schematically illustrates an example of a functional configuration of a communication control device 300.

FIG. 4 schematically illustrates an example of a functional configuration of the communication control device 300. The communication control device 300 includes a communication control unit 302, an FL communication unit 304, a base station unit 306, an UP execution unit 308, and a switch unit 310.

The FL communication unit 304 establishes the feeder link 102 with the gateway 40 on the ground by an FL antenna for communication with the gateway 40 on the ground. The FL communication unit 304 communicates with the core network 20 on the ground via the feeder link 102.

The FL communication unit 304 establishes the feeder link 108 with the other HAPS 100 by an FL antenna for communication with the other HAPS 100. The HAPS 100 may include a plurality of FL antennas for communication with the other HAPS 100, and the FL communication unit 304 may establish the feeder link 108 with each of a plurality of other HAPSs 100. The FL communication unit 304 communicates with the other HAPS 100 via the feeder link 108.

The base station unit 306 executes a base station function. The base station unit 306 forms the wireless communication area 106 by irradiating the beam 104 towards the ground by using the SL antenna. The base station unit 306 may establish a service link with the user terminal 30 in the wireless communication area 106. The base station unit 306 functions as an eNB (eNodeB), for example. In addition, the base station unit 306 functions as a gNB (gNodeB), for example.

The UP execution unit 308 executes the user plane function. The UP execution unit 308 may be able to execute the user plane function as software. The UP execution unit 308 may be able to activate or stop the user plane function.

The switch unit 310 is connected to the FL communication unit 304, the base station unit 306, and the UP execution unit 308. The switch unit 310 is a physical switch. The switch unit 310 is, for example, an L3 switch. In addition, the switch unit 310 is, for example, an L2 switch.

The communication control unit 302 may perform control such that communication between a plurality of mutual user terminals 30 in the wireless communication area 106 is relayed without intermediation of the core network 20 by the user plane function of the UP execution unit 308. In addition, the communication control unit 302 may perform control such that communication between the user terminal 30 in the wireless communication area 106 and the user terminal 30 in the wireless communication area 106 of the other HAPS 100 is relayed without intermediation of the core network 20.

The communication control unit 302 causes the UP execution unit 308 to activate the user plane function in response to an instruction received from the control system 400 of the core network 20 via the FL communication unit 304. Then, the communication between the plurality of mutual user terminals 30 in the wireless communication area 106 is relayed or the communication between the user terminal 30 in the wireless communication area 106 and the user terminal 30 in the other wireless communication area 106 of the other HAPS 100 is relayed by the user plane function.

The control system 400 stores information of the user terminal 30 in advance which has a return communication contract, for example. The return communication contract may be a contract for performing, when the user terminal is present in the wireless communication area 106 of the HAPS 100 and performs communication via the HAPS 100, communication via the HAPS 100 without intermediation of the core network 20. The control system 400 may store the information of the user terminal 30 which has the contract for each of organizations for which communication lines are desirably partitioned from a security point of view. Examples of the organizations include an enterprise, an institution, and the like, but may also be an organization constituted regardless of such a partition.

For example, when a connection request from the first user terminal 30 present in the wireless communication area 106 of a first HAPS 100 to the second user terminal 30 present in the wireless communication area 106 of a second HAPS 100 is received via the first HAPS 100, the control system 400 confirms whether the first user terminal 30 and the second user terminal 30 have the return communication contract.

When it is determined that the user terminals have the return communication contract, the control system 400 transmits an instruction for activating the user plane function to each of the first HAPS 100 and the second HAPS 100. Then, the control system 400 causes the first HAPS 100 and the second HAPS 100 to construct a closed area network between the first user terminal 30 and the second user terminal 30. The control system 400 may cause the first HAPS 100 and the second HAPS 100 to construct a closed area network corresponding to an organization to which the first user terminal 30 and the second user terminal 30 belong. For example, when communication between a third user terminal 30 and a fourth user terminal 30 which belong to an organization different from that of the first user terminal 30 and the second user terminal 30 is to be relayed, the control system 400 may cause the first HAPS 100 and the second HAPS 100 to construct a closed area network corresponding to the organization to which the third user terminal 30 and the fourth user terminal 30 belong.

When the control system 400 determines that the user terminals do not have the return communication contract, the communication between the first user terminal 30 and the second user terminal 30 is executed via the HAPS 100 by the user plane function on the ground.

The communication control unit 302 may perform control such that the UP execution unit 308 is caused to activate the user plane function in response to an instruction received from the core network 20 via the FL communication unit 304, and the communication between the first user terminal 30 and the second user terminal 30 is relayed without intermediation of the core network 20 by the user plane function. The communication control unit 302 may cause the UP execution unit 308 to stop the user plane function in response to an end of communication between the first user terminal 30 and the second user terminal 30. Thus, the electric power consumption can be appropriately reduced.

After causing the UP execution unit 308 to activate the user plane function in response to an instruction from the control system 400, the communication control unit 302 controls the switch unit 310 such that a closed area network is constructed between the first user terminal 30 and the second user terminal 30. When the switch unit 310 is an L3 switch, the communication control unit 302 may construct the closed area network by a VRF (Virtual Routing and Forwarding). When the switch unit 310 is an L2 switch, the communication control unit 302 may construct the closed area network by a VLAN (Virtual Local Area Network).

For example, when a connection request from the first user terminal 30 present in the wireless communication area 106 of the first HAPS 100 to the second user terminal 30 present in the wireless communication area 106 of the first HAPS 100 is received via the first HAPS 100, the control system 400 similarly confirms whether the first user terminal 30 and the second user terminal 30 have the return communication contract.

When it is determined that the user terminals have the return communication contract, the control system 400 transmits an instruction for activating the user plane function to the first HAPS 100. Then, the control system 400 causes the first HAPS 100 to construct a closed area network between the first user terminal 30 and the second user terminal 30. The control system 400 may cause the first HAPS 100 to construct a closed area network corresponding to an organization to which the first user terminal 30 and the second user terminal 30 belong.

When the control system 400 determines that the user terminals do not have the return communication contract, the communication between the first user terminal 30 and the second user terminal 30 is executed via the HAPS 100 by the user plane function on the ground.

After causing the UP execution unit 308 to activate the user plane function in response to an instruction from the control system 400, the communication control unit 302 controls the switch unit 310 such that a closed area network is constructed between the first user terminal 30 and the second user terminal 30. When the switch unit 310 is an L3 switch, the communication control unit 302 may construct the closed area network by a VRF. When the switch unit 310 is an L2 switch, the communication control unit 302 may construct the closed area network by a VLAN.

Figure 5:
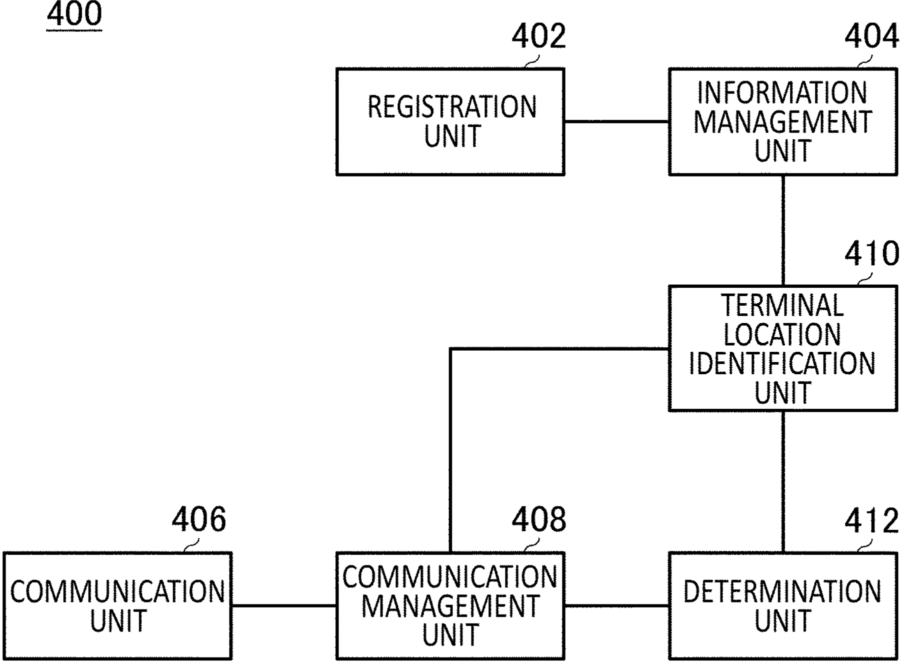
FIG. 5 schematically illustrates an example of a functional configuration of a control system 400.

FIG. 5 schematically illustrates an example of a functional configuration of the control system 400. The control system 400 includes a registration unit 402, an information management unit 404, a communication unit 406, a communication management unit 408, a terminal location identification unit 410, and a determination unit 412.

The registration unit 402 registers information of the user terminal 30. The registration unit 402 registers various types of contract information related to the user terminal 30. The registration unit 402 registers the return communication contract of the user terminal 30, for example. The information management unit 404 manages the information of the user terminal 30 which is registered by the registration unit 402.

The communication unit 406 executes various types of communication. The communication unit 406 communicates with the HAPS 100 via the core network 20 and the gateway 40, for example. In addition, the communication unit 406 communicates, via the HAPS 100, with the user terminal 30 present in the wireless communication area 106 of the HAPS 100. The communication management unit 408 manages communication performed by the communication unit 406.

The terminal location identification unit 410 identifies a location of the user terminal 30. For example, the terminal location identification unit 410 identifies in which one of a plurality of the HAPSs 100 the user terminal 30 is present.

When a connection request to the second user terminal 30 by the first user terminal 30 present in the wireless communication area 106 of the HAPS 100 is received from the HAPS 100, the determination unit 412 determines whether the first user terminal 30 and the second user terminal 30 are contract user terminals which have the return communication contract.

For example, when a connection request to the second user terminal 30 present in a second wireless communication area 106 different from a first wireless communication area 106 by the first user terminal 30 present in the first wireless communication area 106 is received, the determination unit 412 determines whether the first user terminal 30 and the second user terminal 30 are contract user terminals which have the return communication contract. When the determination unit 412 determines that the first user terminal 30 and the second user terminal 30 are the contract user terminals, the communication management unit 408 may transmit, to the HAPS 100 which forms the first wireless communication area 106 and the HAPS 100 which forms the second wireless communication area 106, an instruction for relaying the communication between the first user terminal 30 and the second user terminal 30 without intermediation of the core network 20. The communication management unit 408 may include an instruction for activating the user plane function in the instruction. The communication management unit 408 may include an instruction for constructing a closed area network between the first user terminal 30 and the second user terminal 30 in the instruction. When the determination unit 412 determines that at least any of the first user terminal 30 or the second user terminal 30 is not the contract user terminal, the communication management unit 408 may perform control such that the communication between the first user terminal 30 and the second user terminal 30 is performed by the user plane function on the ground.

The determination unit 412 may further determine whether the first user terminal 30 and the second user terminal 30 belong to a same organization. When the determination unit 412 determines that the first user terminal 30 and the second user terminal 30 are the contract user terminals and also belong to the same organization, the communication management unit 408 may transmit an instruction, to the HAPS 100 which forms the first wireless communication area 106 and the HAPS 100 which forms the second wireless communication area 106, for relaying the communication between the first user terminal 30 and the second user terminal 30 without intermediation of the core network 20. The communication management unit 408 may include, in the instruction, an instruction for constructing a closed area network corresponding to the organization to which the first user terminal 30 and the second user terminal 30 belong.

In addition, for example, when a connection request to the second user terminal 30 present in the first wireless communication area 106 by the first user terminal 30 present in the first wireless communication area 106 is received, the determination unit 412 determines whether the first user terminal 30 and the second user terminal 30 are contract user terminals which have the return communication contract. When the determination unit 412 determines that the first user terminal 30 and the second user terminal 30 are the contract user terminals, the communication management unit 408 may transmit an instruction for relaying the communication between the first user terminal 30 and the second user terminal 30 without intermediation of the core network 20 to the HAPS 100 which forms the first wireless communication area 106. The communication management unit 408 may include an instruction for activating the user plane function in the instruction. The communication management unit 408 may include an instruction for constructing a closed area network between the first user terminal 30 and the second user terminal 30 in the instruction. When the determination unit 412 determines that at least any of the first user terminal 30 or the second user terminal 30 is not the contract user terminal, the communication management unit 408 may perform control such that the communication between the first user terminal 30 and the second user terminal 30 is performed by the user plane function on the ground.

The determination unit 412 may further determine whether the first user terminal 30 and the second user terminal 30 belong to a same organization. When the determination unit 412 determines that the first user terminal 30 and the second user terminal 30 are the contract user terminals and also belong to the same organization, the communication management unit 408 may transmit, to the HAPS 100 which forms the first wireless communication area 106, an instruction for relaying the communication between the first user terminal 30 and the second user terminal 30 without intermediation of the core network 20. The communication management unit 408 may include, in the instruction, an instruction for constructing a closed area network corresponding to the organization to which the first user terminal 30 and the second user terminal 30 belong.

Figure 6:
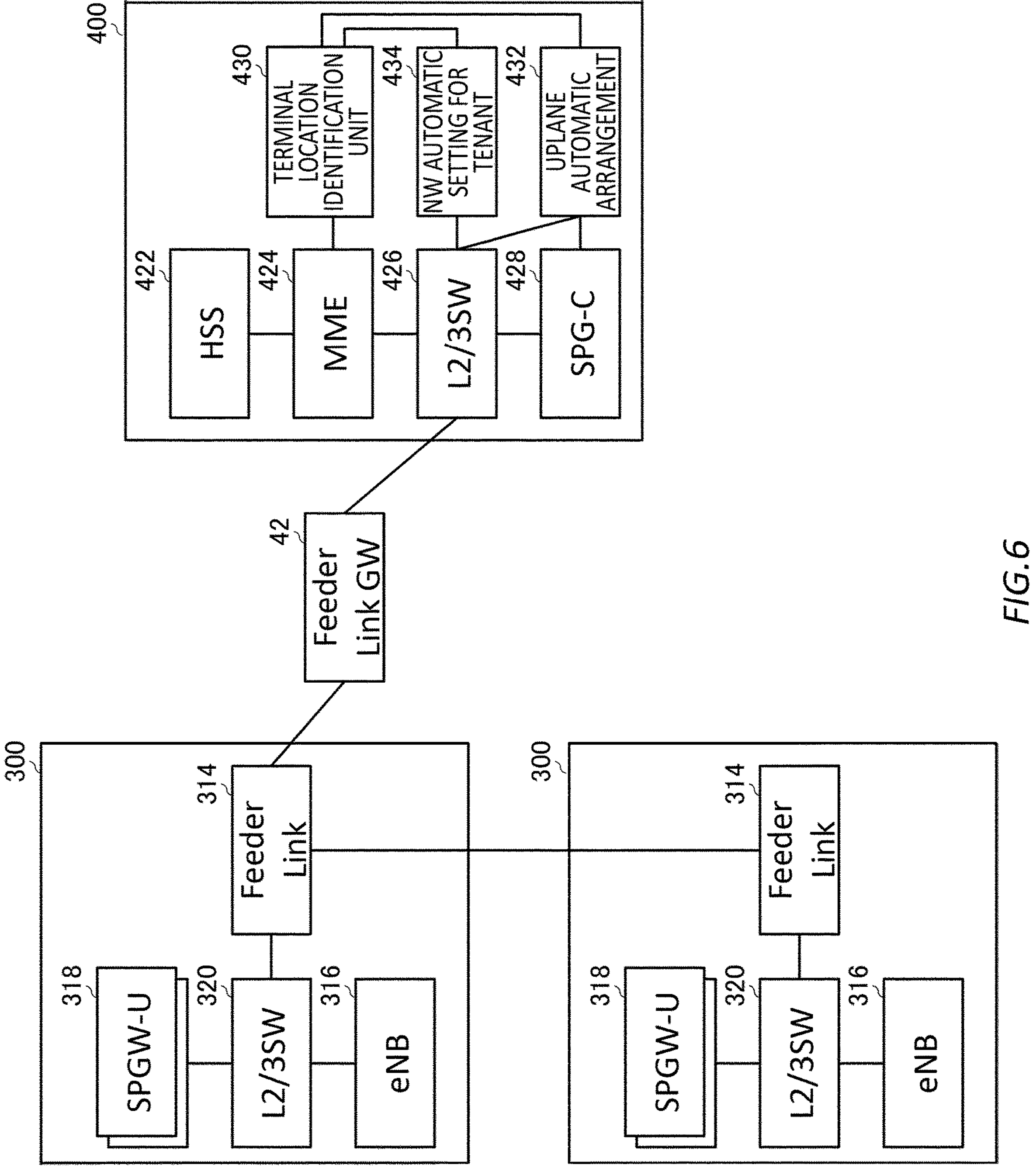
FIG. 6 schematically illustrates an example of a configuration of the communication control device 300 and the control system 400.

FIG. 6 schematically illustrates an example of a configuration of the communication control device 300 and the control system 400. Herein, the communication control device 300 and the control system 400 are compliant to the LTE communication method, and a state is exemplified in which a first communication control device 300 establishes a feeder link with each of a Feeder Link GW 42 on the ground and a second communication control device 300.

The communication control device 300 includes a Feeder Link 314, an eNB 316, an SPGW-U 318, and an L2/3 SW 320. The Feeder Link 314 may be an example of the FL communication unit 304. The eNB 316 may be an example of the base station unit 306. The SPGW-U 318 may be an example of the UP execution unit 308. The L2/3 SW 320 may be an example of the switch unit 310.

The control system 400 includes an HSS 422, an MME 424, an L2/3 SW 426, an SPG-C 428, a terminal location identification unit 430, a Uplane automatic arrangement 432, and an NW automatic setting for tenant 434. The HSS 422 may be an example of the information management unit 404. The terminal location identification unit 430 identifies a location of the user terminal 30. The terminal location identification unit 430 may be an example of the terminal location identification unit 410.

The Uplane automatic arrangement 432 automatically arranges a user plane for each of a plurality of the HAPSs 100 based on a location of the user terminal 30 which is managed by the terminal location identification unit 430, a contract situation of the user terminal 30 which is managed by the HSS 422, and a communication situation of the user terminal 30 which is managed by the SPG-C 428. For example, when communication between the first user terminal 30 present in the first wireless communication area 106 formed by the first communication control device 300 and the second user terminal 30 present in the second wireless communication area 106 formed by the second communication control device 300 is to be performed and also when the first user terminal 30 and the second user terminal 30 are the contract user terminals, the Uplane automatic arrangement 432 causes the SPGW-U 318 of the first communication control device 300 and the SPGW-U 318 of the second communication control device 300 to be activated.

The NW automatic setting for tenant 434 causes a closed area network to be constructed between the first user terminal 30 and the second user terminal 30. The NW automatic setting for tenant 434 causes a closed area network corresponding to an organization to which the first user terminal 30 and the second user terminal 30 belongs to be constructed between the first user terminal 30 and the second user terminal 30. The NW automatic setting for tenant 434 may cause a closed area network to be constructed by controlling the L2/3 SW 320 of the first communication control device 300 and the L2/3 SW 320 of the second communication control device 300. The NW automatic setting for tenant 434 causes the closed area network to be constructed by the VRF, for example. In addition, the NW automatic setting for tenant 434 causes the closed area network to be constructed by the VLAN, for example.

Figure 7:
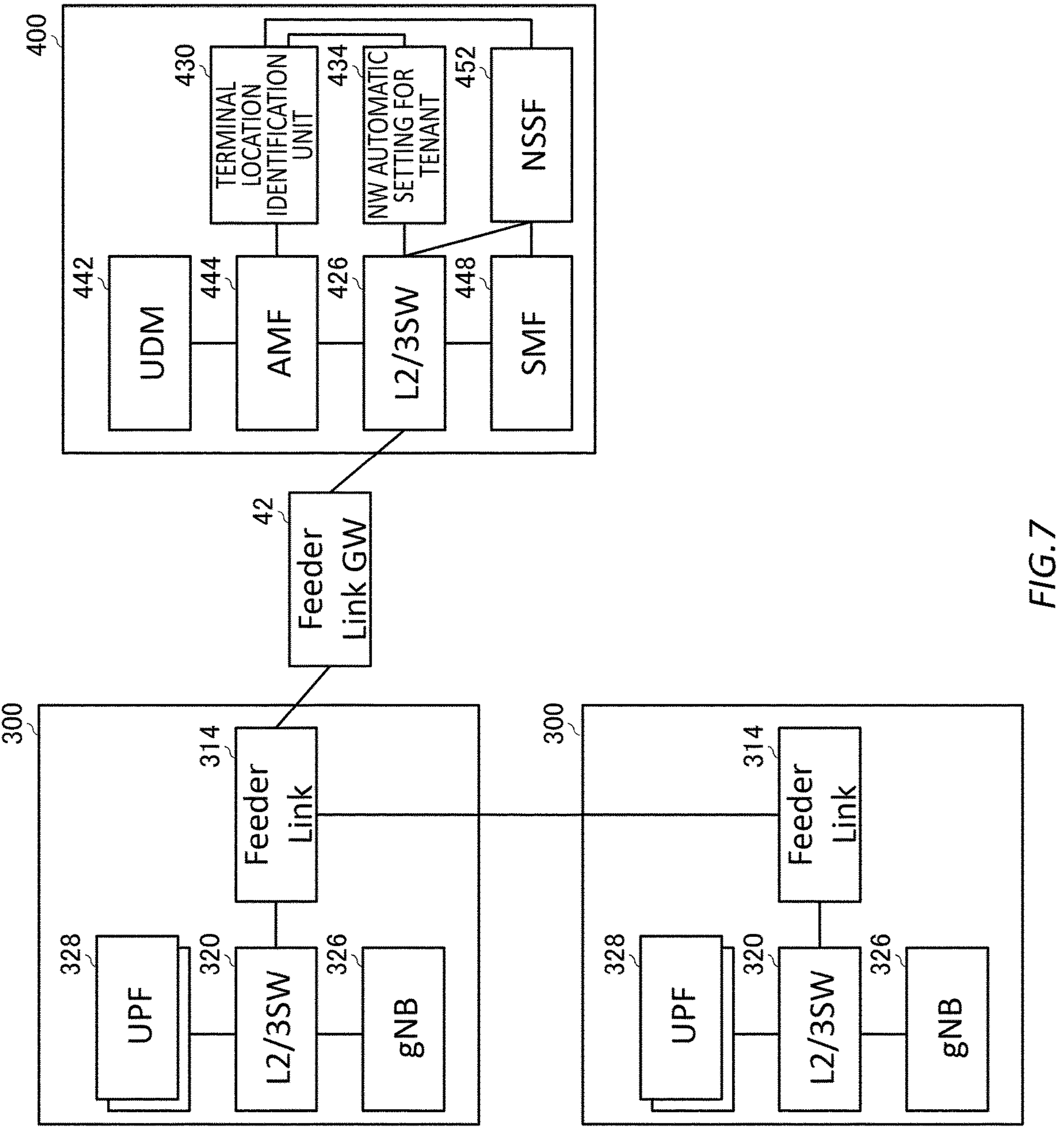
FIG. 7 schematically illustrates an example of the configuration of the communication control device 300 and the control system 400.

FIG. 7 schematically illustrates an example of the configuration of the communication control device 300 and the control system 400. Herein, the communication control device 300 and the control system 400 are compliant to the 5G communication method, and a state is exemplified in which the first communication control device 300 establishes the feeder link with each of the Feeder Link GW 42 on the ground and the second communication control device 300. Herein, different aspects from FIG. 6 will be mainly described.

The communication control device 300 includes the Feeder Link 314, a gNB 326, a UPF 328, and the L2/3 SW 320. The gNB 326 may be an example of the base station unit 306. The UPF 328 may be an example of the UP execution unit 308.

The control system 400 includes a UDM 442, an AME 444, an SMF 448, the terminal location identification unit 430, an NSSF 452, and the NW automatic setting for tenant 434. The UDM 442 may be an example of the information management unit 404.

The NSSF 452 automatically arranges a user plane for each of a plurality of the HAPSs 100 based on a location of the user terminal 30 which is managed by the terminal location identification unit 430, a contract situation of the user terminal 30 which is managed by the UDM 442, and a communication situation of the user terminal 30 which is managed by the SMF 448. For example, when communication between the first user terminal 30 present in the first wireless communication area 106 formed by the first communication control device 300 and the second user terminal 30 present in the second wireless communication area 106 formed by the second communication control device 300 is to be performed and also when the first user terminal 30 and the second user terminal 30 are the contract user terminals, the NSSF 452 causes the UPF 328 of the first communication control device 300 and the UPF 328 of the second communication control device 300 to be activated.

The NW automatic setting for tenant 434 causes a closed area network to be constructed between the first user terminal 30 and the second user terminal 30. The NW automatic setting for tenant 434 causes a closed area network corresponding to an organization to which the first user terminal 30 and the second user terminal 30 belongs to be constructed between the first user terminal 30 and the second user terminal 30. The NW automatic setting for tenant 434 may cause a closed area network to be constructed by controlling the L2/3 SW 320 of the first communication control device 300 and the L2/3 SW 320 of the second communication control device 300. The NW automatic setting for tenant 434 may cause a closed area network to be constructed between the first user terminal 30 and the second user terminal 30 by using a network slicing function.

Figure 8:
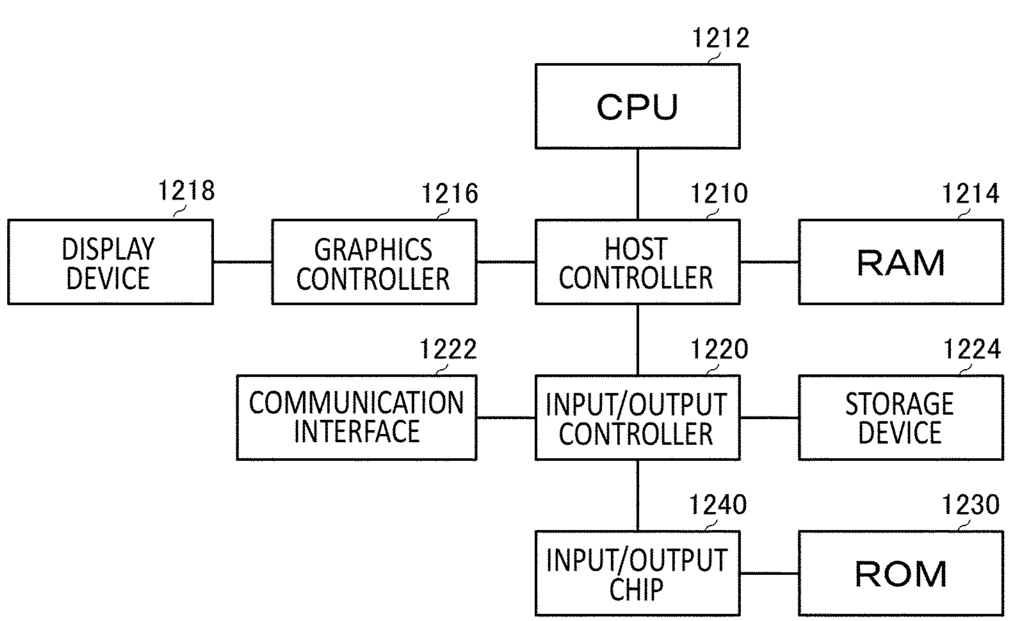
FIG. 8 schematically illustrates an example of a hardware configuration of a computer 1200 functioning as the communication control device 300 or the control system 400.

FIG. 8 schematically illustrates an example of a hardware configuration of a computer 1200 functioning as the communication control device 300 or the control system 400. Programs installed in the computer 1200 can cause the computer 1200 to function as one or more "units" of the device according to the above described embodiment or can cause the computer 1200 to execute operations associated with the devices according to the above described embodiment or the one or more "units", and/or can cause the computer 1200 to execute a process according to the above described embodiment or steps of the process. Such a program may be executed by a CPU 1212 to cause the computer 1200 to perform specific operations associated with some or all of the blocks in the flowcharts and block diagrams described in the specification.

The computer 1200 according to the present embodiment includes a CPU 1212, a RAM 1214, and a graphics controller 1216, which are connected to each other via a host controller 1210. In addition, the computer 1200 includes input/output units such as a communication interface 1222, a storage device 1224, and a DVD drive and an IC card drive, which are connected to the host controller 1210 via an input/output controller 1220. The storage device 1224 may be a hard disk drive, a solid-state drive, and the like. The computer 1200 also includes a ROM 1230 and a legacy input/output unit such as a keyboard, which are connected to the input/output controller 1220 via an input/output chip 1240.

The CPU 1212 operates according to the programs stored in the ROM 1230 and the RAM 1214, thereby controlling each unit. The graphics controller 1216 obtains image data which is generated, by the CPU 1212, in a frame buffer or the like provided in the RAM 1214 or in itself so as to cause the image data to be displayed on a display device 1218.

The communication interface 1222 communicates with other electronic devices via a network. The storage device 1224 stores a program and data used by the CPU 1212 in the computer 1200. The IC card drive reads the program and data from an IC card, and/or writes the program and data to the IC card.

The ROM 1230 stores therein a boot program or the like executed by the computer 1200 at the time of activation, and/or a program depending on the hardware of the computer 1200. The input/output chip 1240 may also connect various input/output units via a USB port, a parallel port, a serial port, a keyboard port, a mouse port, or the like to the input/output controller 1220.

A program is provided by a computer readable storage medium such as the DVD-ROM or the IC card. The program is read from the computer readable storage medium, installed into the storage device 1224, RAM 1214, or ROM 1230, which are also examples of a computer readable storage medium, and executed by the CPU 1212. Information processing written in these programs is read by the computer 1200, and provides cooperation between the programs and the various types of hardware resources described above. A device or method may be constituted by realizing the operation or processing of information in accordance with the use of the computer 1200.

For example, in a case where a communication is performed between the computer 1200 and an external device, the CPU 1212 may execute a communication program loaded in the RAM 1214 and instruct the communication interface 1222 to perform communication processing based on a process written in the communication program. The communication interface 1222, under control of the CPU 1212, reads transmission data stored on a transmission buffer region provided in a recording medium such as the RAM 1214, the storage device 1224, the DVD-ROM, or the IC card, and transmits the read transmission data to a network or writes reception data received from a network to a reception buffer region or the like provided on the recording medium.

In addition, the CPU 1212 may cause all or a necessary portion of a file or a database to be read into the RAM 1214, the file or the database having been stored in an external recording medium such as the storage device 1224, the DVD drive (DVD-ROM), the IC card, etc., and perform various types of processing on the data on the RAM 1214. Then, the CPU 1212 may write the processed data back in the external recording medium.

Various types of information, such as various types of programs, data, tables, and databases, may be stored in the recording medium to undergo information processing. The CPU 1212 may execute, on the data read from the RAM 1214, various types of processing including various types of operations, information processing, conditional judgement, conditional branching, unconditional branching, information retrieval/replacement, or the like described throughout the present disclosure and specified by instruction sequences of the programs, to write the results back to the RAM 1214. In addition, the CPU 1212 may retrieve information in a file, a database, or the like in the recording medium. For example, when a plurality of entries, each having an attribute value of a first attribute associated with an attribute value of a second attribute, are stored in the recording medium, the CPU 1212 may search for an entry whose attribute value of the first attribute matches a designated condition, from among the plurality of entries, and read the attribute value of the second attribute stored in the entry, thereby obtaining the attribute value of the second attribute associated with the first attribute satisfying a predetermined condition.

The programs or software module described above may be stored on the computer 1200 or in a computer readable storage medium near the computer 1200. In addition, a recording medium such as a hard disk or a RAM provided in a server system connected to a dedicated communication network or the Internet can be used as the computer readable storage medium, thereby providing the program to the computer 1200 via the network.

Blocks in flowcharts and block diagrams in the present embodiments may represent steps of processes in which operations are performed or "units" of devices responsible for performing operations. A specific step and "unit" may be implemented by dedicated circuitry, programmable circuitry supplied along with a computer readable instruction stored on a computer readable storage medium, and/or a processor supplied along with the computer readable instruction stored on the computer readable storage medium. The dedicated circuitry may include a digital and/or analog hardware circuit, or may include an integrated circuit (IC) and/or a discrete circuit. The programmable circuitry may include, for example, a reconfigurable hardware circuit including logical AND, logical OR, logical XOR, logical NAND, logical NOR, and other logical operations, and a flip-flop, a register, and a memory element, such as a field-programmable gate array (FPGA) and a programmable logic array (PLA).

The computer readable storage medium may include any tangible device capable of storing an instruction performed by an appropriate device, so that the computer readable storage medium having the instruction stored thereon constitutes a product including an instruction that may be performed in order to provide means for performing an operation specified by a flowchart or a block diagram. An example of the computer readable storage medium may include an electronic storage medium, a magnetic storage medium, an optical storage medium, an electromagnetic storage medium, or a semiconductor storage medium. More specific examples of computer readable storage media may include a floppy (registered trademark) disc, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a compact disc read-only memory (CD-ROM), a digital versatile disk (DVD), a BLU-RAY (registered trademark) disc, a memory stick, an integrated circuit card, etc.

The computer readable instruction may include an assembler instruction, an instruction-set-architecture (ISA) instruction, a machine instruction, a machine dependent instruction, a microcode, a firmware instruction, state-setting data, or either of source code or object code written in any combination of one or more programming languages including an object oriented programming language such as Smalltalk (registered trademark), JAVA (registered trademark), and C++, and a conventional procedural programming language such as a "C" programming language or a similar programming language.

The computer readable instruction may be provided to a general purpose computer, a special purpose computer, or a processor or programmable circuitry of another programmable data processing device locally or via a local area network (LAN), a wide area network (WAN) such as the Internet or the like in order that the general purpose computer, the special purpose computer, or the processor or the programmable circuitry of the other programmable data processing device performs the computer readable instruction to provide means for performing operations specified by the flowchart or the block diagram. Examples of the processor include a computer processor, a processing unit, a microprocessor, a digital signal processor, a controller, a microcontroller, and the like.

In the above described embodiment, the description has been provided where the HAPS 100 is used as an example of the flight vehicle which has the antenna for forming the wireless communication area by irradiating the beam towards the ground to provide the wireless communication service to the user terminal in the wireless communication area, but the example is not limited to this. Examples of the flight vehicle include unmanned aerial vehicles such as a balloon, an airship, a plane, and a drone which can form the wireless communication area.

While the present invention has been described with the embodiments, the technical scope of the present invention is not limited to the above described embodiments. It is apparent to persons skilled in the art that various alterations and improvements can be added to the above described embodiments. It is also apparent from the scope of the claims that the embodiments added with such alterations or improvements can be included in the technical scope of the present invention.

The operations, procedures, steps, and stages of each process performed by a device, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

10: communication management system; 20: network; 30: user terminal; 40: gateway; 42: Feeder Link GW; 100: HAPS; 102: feeder link; 104: beam; 106: wireless communication area; 108: feeder link; 110: main body section; 120: wing section; 130: solar panel; 150: HAPS; 200: flight control device; 300: communication control device; 302: communication control unit; 304: FL communication unit; 306: base station unit; 308: UP execution unit; 310: switch unit; 314: Feeder Link; 316: eNB; 318: SPGW-U; 320: L2/3 SW; 326: gNB; 328: UPF; 400: control system; 402: registration unit; 404: information management unit; 406: communication unit; 408: communication management unit; 410: terminal location identification unit; 412: determination unit; 422: HSS; 424: MME; 426: L2/3 SW; 428: SPG-C; 430: terminal location identification unit; 432: Uplane automatic arrangement; 434: NW automatic setting for tenant; 442: UDM; 444: AME; 448: SMF; 452: NSSF; 1200: computer; 1210: host controller; 1212: CPU; 1214: RAM; 1216: graphics controller; 1218: display device; 1220: input/output controller; 1222: communication interface; 1224: storage device; 1230: ROM; 1240: input/output chip.

What is claimed is:

1. A flight vehicle which has an antenna for forming a wireless communication area by irradiating beam towards a ground to provide a wireless communication service to a user terminal in the wireless communication area, the flight vehicle comprising:

an FL communication unit which communicates with a core network on the ground via a feeder link;

a UP execution unit which executes a user plane function; and a communication control unit which performs control such that communication between a first user terminal in the wireless communication area and a second user terminal in an other wireless communication area of an other flight vehicle is relayed without intermediation of the core network by the user plane function.

2. The flight vehicle according to claim 1, wherein the communication control unit performs control such that a closed area network is constructed between the first user terminal in the wireless communication area and the second user terminal in the other wireless communication area of the other flight vehicle.

3. The flight vehicle according to claim 2, comprising:

a base station unit configured to execute a base station function; and a switch unit connected to the base station unit, the UP execution unit, and the FL communication unit, wherein the communication control unit controls the switch unit to thereby construct a closed area network between the first user terminal in the wireless communication area and the second user terminal in the other wireless communication area of the other flight vehicle.

4. The flight vehicle according to claim 3, wherein the switch unit is an L3 switch, and the communication control unit performs control such that the closed area network is constructed by a VRF.

5. The flight vehicle according to claim 3, wherein the switch unit is an L2 switch, and the communication control unit performs control such that the closed area network is constructed by a VLAN.

6. The flight vehicle according to claim 3, wherein the closed area network corresponds to an organization to which the first user terminal and the second user terminal belong.

7. The flight vehicle according to claim 2, wherein the communication control unit performs control such that in response to an instruction received from the core network via the FL communication unit, the UP execution unit is caused to activate the user plane function to relay the communication between the first user terminal and the second user terminal without intermediation of the core network by the user plane function.

8. The flight vehicle according to claim 1, wherein the communication control unit performs control such that in response to an instruction received from the core network via the FL communication unit, the UP execution unit is caused to activate the user plane function to relay the communication between the first user terminal and the second user terminal without intermediation of the core network by the user plane function.

9. The flight vehicle according to claim 8, wherein in response to an end of the communication between the first user terminal and the second user terminal, the communication control unit causes the UP execution unit to stop the user plane function.

10. A communication management system comprising:

the flight vehicle according to claim 1; and a control system arranged in the core network, wherein the communication control unit performs control such that in response to an instruction from the control system, communication between the first user terminal in the wireless communication area and the second user terminal in the other wireless communication area of the other flight vehicle is relayed without intermediation of the core network by the user plane function.

11. The communication management system according to claim 10, wherein when the first user terminal and the second user terminal have a contract for performing communication via the flight vehicle without intermediation of a core network, the control system transmits the instruction to the communication control unit.

12. A control method executed by a flight vehicle which has an antenna for forming a wireless communication area by irradiating beam towards a ground to provide a wireless communication service to a user terminal in the wireless communication area, the control method comprising:

performing FL communication to communicate with a core network on the ground via a feeder link;

performing UP execution by executing a user plane function; and performing communication control by performing control such that communication between a first user terminal in the wireless communication area and a second user terminal in an other wireless communication area of an other flight vehicle is relayed without intermediation of the core network by the user plane function.

13. The control method according to claim 12, wherein the flight vehicle includes a FL communication unit, a base station unit, a UP execution unit, a communication control unit and a switch unit connected to the base station unit, the UP execution unit, and the FL communication unit, wherein the performing FL communication is performed by the FL communication unit;

wherein the performing UP execution is performed by the UP execution unit; and wherein the performing communication control is performed by the communication control unit, wherein the control method further comprises:

executing a base station function by the base station unit, wherein the performing communication control includes controlling the switch unit such that a closed area network corresponding to an organization to which the first user terminal and the second user terminal belong is constructed between the first user terminal in the wireless communication area and the second user terminal in the other wireless communication area of the other flight vehicle.

* * * * *